United States Patent [19]

Hüttlin

[11] Patent Number: 4,697,356
[45] Date of Patent: Oct. 6, 1987

[54] FLUIDIZED BED APPARATUS

[76] Inventor: Herbert Hüttlin, Daimler Strasse 7, 7853 Steinen, Fed. Rep. of Germany

[21] Appl. No.: 893,628

[22] Filed: Aug. 6, 1986

[51] Int. Cl.$^4$ ............................................. F26B 17/10
[52] U.S. Cl. ................................... 34/57 A; 34/57 D; 34/82; 55/294; 55/350
[58] Field of Search .................. 55/294, 302, 350; 34/82, 57 A, 57 R, 57 D

[56] References Cited

U.S. PATENT DOCUMENTS

| | | |
|---|---|---|
| 2,786,280 | 3/1957 | Gishler et al. . |
| 3,204,942 | 9/1965 | Matthys et al. . |
| 3,334,868 | 8/1967 | Lage . |
| 3,385,724 | 5/1968 | Grün . |
| 3,386,182 | 6/1968 | Lippert . |
| 3,411,480 | 11/1968 | Grass, Jr. et al. . |
| 3,757,496 | 9/1973 | Berg ..................................... 55/294 |
| 4,002,325 | 1/1977 | Herfeld . |
| 4,050,406 | 9/1977 | Reni . |
| 4,168,914 | 9/1979 | Larson et al. . |
| 4,217,851 | 8/1980 | Biehl et al. . |
| 4,425,865 | 1/1984 | Hörner et al. . |
| 4,466,082 | 8/1984 | Zoschak et al. . |
| 4,587,744 | 5/1986 | Hüttlin . |

FOREIGN PATENT DOCUMENTS

| | | |
|---|---|---|
| 0013894 | 9/1983 | European Pat. Off. . |
| 872928 | 4/1953 | Fed. Rep. of Germany . |
| 1849891 | 4/1962 | Fed. Rep. of Germany . |
| 1297447 | 6/1969 | Fed. Rep. of Germany . |
| 1577729 | 9/1969 | Fed. Rep. of Germany . |
| 1632404 | 8/1970 | Fed. Rep. of Germany . |
| 2299903 | 2/1975 | France . |
| 38538 | 7/1965 | German Democratic Rep. . |
| 264592 | 9/1946 | Switzerland . |
| 2043219 | 10/1980 | United Kingdom . |

Primary Examiner—Larry I. Schwartz
Attorney, Agent, or Firm—Brumbaugh, Graves, Donohue & Raymond

[57] ABSTRACT

A vessel (10) is formed with a convexity of the shape of a dish (24). An immersion tube (40) protrudes into the vessel (10) and terminates inside the dish (24), being adapted for connection to a source of gas which will flow through the immersion tube in the direction of the dish by which it will be deflected so as to fluidize pulverous or granular material (30) contained in the vessel (10). A filter casing (50) is placed on top of the vessel (10) and it contains a filter (56) to hold back particles of material being treated which left the vessel. A rotating vane (60) is associated with the filter (56) and driven by a turbine (70) arranged in the immersion tube (40) so that the rotating vane will sweep across the filter (56). A slot nozzle (74) is formed at the rotating vane (60) and sucks off material from the filter (56) so as to keep it clean. The particles of material sucked off pass through a hollow shaft (62) into the immersion tube (40) and then back once more into the vessel (10).

9 Claims, 3 Drawing Figures

FLUIDIZED BED APPARATUS

The instant invention relates to a fluidized bed apparatus for mixing, drying, granulating, pelleting, varnishing, and/or coating pulverous or granular material, comprising a vessel formed with a convexity configured like a dish, an immersion tube protruding into the vessel, ending within the dish, and connectable to a source of a gas which will flow through the immersion tube in the direction of the dish to be deflected by the latter so as to move the material contained in the vessel, especially to fluidize it, and a filter casing which is attached to the vessel, contains a filter to hold back material which exited from the vessel, and comprises a gas outlet.

In a known fluidized bed apparatus of this kind (EP-A-O 103 894) the filter casing contains a plurality of hose-like filters arranged side by side. As is known from other sources, such filters usually are freed of material which has accumulated on their inner sides by shaking them one after the other. In general, it is necessary to interrupt flow through the respective filter in order to be able to loosen the material by vibration. This procedure as well as the vibrating require apparatus which are expensive and yet cannot exclude the risk of greater amounts of material depositing on one or the other of the filters in the course of several cycles of vibration. Such deposits finally may fall back into the vessel in the form of large lumps and contaminate the material being treated as they no longer can be processed with the desired degree of uniformity.

It is an object of the instant invention to develop a fluidized bed apparatus of the generic kind described such that the material held back by the filter is removed reliably and uniformly from the filter before it gets a chance to form any greater agglomerates.

This object is met, in accordance with the invention, in that at least one rotating vane is associated with the filter and sweeps across the filter.

The rotating vane may be connected to an external drive means, such as an electric motor. Yet a further development of the invention is especially advantageous. With this development a turbine is arranged in the immersion tube to drive the rotating vane.

The gas used for treating, especially fluidizing the material and introduced through the immersion tube into the vessel necessarily disposes of considerable flow energy in the immersion tube. The turbine according to the invention utilizes part of this energy for having at least one rotating vane revolve constantly during operation of the fluidized bed apparatus so that it will permanently remove material adhering to the filter. The speed of rotation of the turbine is proportional to the rate of gas flow and thus also to the quantity of material deposited on the filter per unit time.

The rotating vane might be of such design as to wipe off the material adhering to the filter and letting it drop back into the vessel. At a sufficiently high number of revolutions of the rotary vane the formation of lumps of the material may be avoided in this manner alone. Preferably, however, the rotating vane is adapted to be driven by a hollow shaft designed to such off the material removed from the filter by the rotating vane. This provides a possibility of leading back the material into the vessel at a location where the creation of even the smallest lumps is unlikely.

It is especially advantageous if the hollow shaft terminates inside the immersion tube and, together with the same, forms a venturi nozzle for generating low pressure in the hollow shaft. The material removed from the filter and introduced into the immersion tube is finely dispersed in a vortex downstream of the venturi nozzle.

In accordance with a further development of the invention it is provided that the rotating vane includes a slot nozzle which sweeps along the filter and communicates with the hollow shaft.

Preferably the slot nozzle is formed between two edges of the rotating vane which are disposed one behind the other in the direction of rotation. The leading edge leaves a gap between itself and the filter, while the trailing edge sweeps directly along the filter.

Finally, it is advantageous to have a vane ring disposed upstream of the turbine and fixed in the immersion tube.

The invention will be described further, by way of example, with reference to the accompanying drawings, in which.

Figure 1:
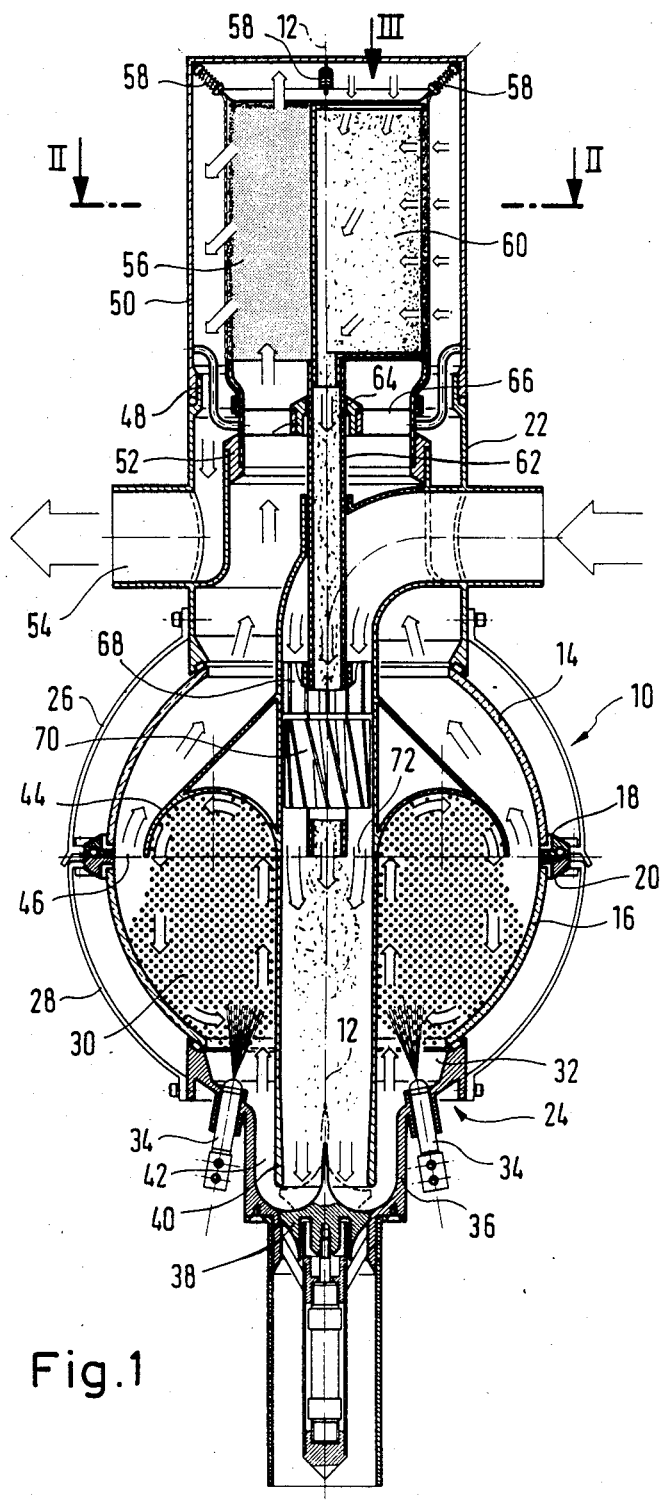
FIG. 1 is an axial sectional elevation of a fluidized bed apparatus according to the invention.

The fluidized bed apparatus shown comprises a substantially spherical vessel 10 and on the whole is substantially rotationally symmetrical with respect to a vertical axis 12 of the vessel. The vessel 10 consists of an upper part 14 and a lower part 16 each having the configuration of a cup-shaped spherical zone, substantially being made of glass, and having flanges 18 and 20 which abut each other in sealing fashion.

The upper part 14 of the vessel is followed in upward direction by a container top 22, whereas the lower part 16 merges in downward direction into a dish 24. Four clamps 26 and 28 each are fixed to the container top 22 and to the dish 24, respectively. They are connected by being braced, for example, by conventional past-dead center catches or similar quick-release closures permitting the parts 14 and 16 of the vessel to be disassembled quickly for cleaning. During such procedure a carrier structure (not shown) of any desired type continues to support either the upper part 14 of the vessel by way of the container top 22 or the lower part 16 by way of the dish 24.

The vessel 10 contains pulverous or granular material 30 which is being mixed or dried or granulated or pelleted or varnished or coated or subjected to a combination of two or more of these procedures. FIG. 1 shows the material 30 in fluidized state which occurs during operation of the apparatus.

The dish 24 has an enlarged upper area 32 in which a plurality of upwardly directed, slightly inwardly inclined nozzles 34 are arranged to spray a liquid, such as sugar solution on the material 30. The upper area 32 is followed in downward direction by a cylindrical wall 36 which in turn is followed by a deflecting zone formed in part by a closure member 38 which is adjustable in height.

Both the closure member 38 and the dish 24 are generally rotationally symmetrical, and the closure member has an axially upwardly directed tip. In FIG. 1 the closure member 38 is shown in full lines in its operative position in which it tightly seals the dish 24 towards the bottom. The closure member 38 may be lifted from this position into an opening member in this position the material 30 may flow out through the dish 24 in downward direction.

An immersion tube 40 passes inwardly in an arch through the container top 22 and then extends axially in the vessel 10 in downward direction to terminate just above the bottom of the dish 24. Together with the cylindrical wall 36 thereof it defines a cylindrical annular space 42. A diverting shield 44 is fixed to the immersion tube 40 within the upper part 14 of the vessel. The outer edge of this shield is disposed in the horizontal dividing plane of the vessel 10, and an annular passage 46 is left free between the shield and the inner wall of the vessel.

At its upper end the container top 22 has an external threaded pipe end 48 in threaded engagement with a filter casing 50. Furthermore, the container top 22 is formed with an internal threaded pipe end 52 which is coaxial with the external threaded pipe end 48 but disposed somewhat deeper. These two threaded pipe ends 48 and 52 define an annular space which opens into a gas outlet 54. The lower open end of a hose- or bag-like filter 56 which is closed at the top is fixed to the internal threaded pipe end 52. The active surfaces of the filter are constituted by a fabric which is suspended from the filter casing 50 by tension springs 58.

Inside the filter 56, a rotating vane 60 is arranged on a hollow shaft 62 supported in a hub member 64. The hub member 64 is fixed to the filter casing 50 by spokes 66. Below the hub member 64 the hollow shaft 62 passes in sealing fashion through the curved upper portion of the immersion tube 40 and extends coaxially with the rectilinear, axial main portion of the immersion tube in downward direction through a stationary vane ring 68 as well as through a turbine 70 fixed to the hollow shaft 62. Below the same, the hollow shaft 62, together with the immersion tube 40 form a venturi nozzle 72.

Figures 2, 3:
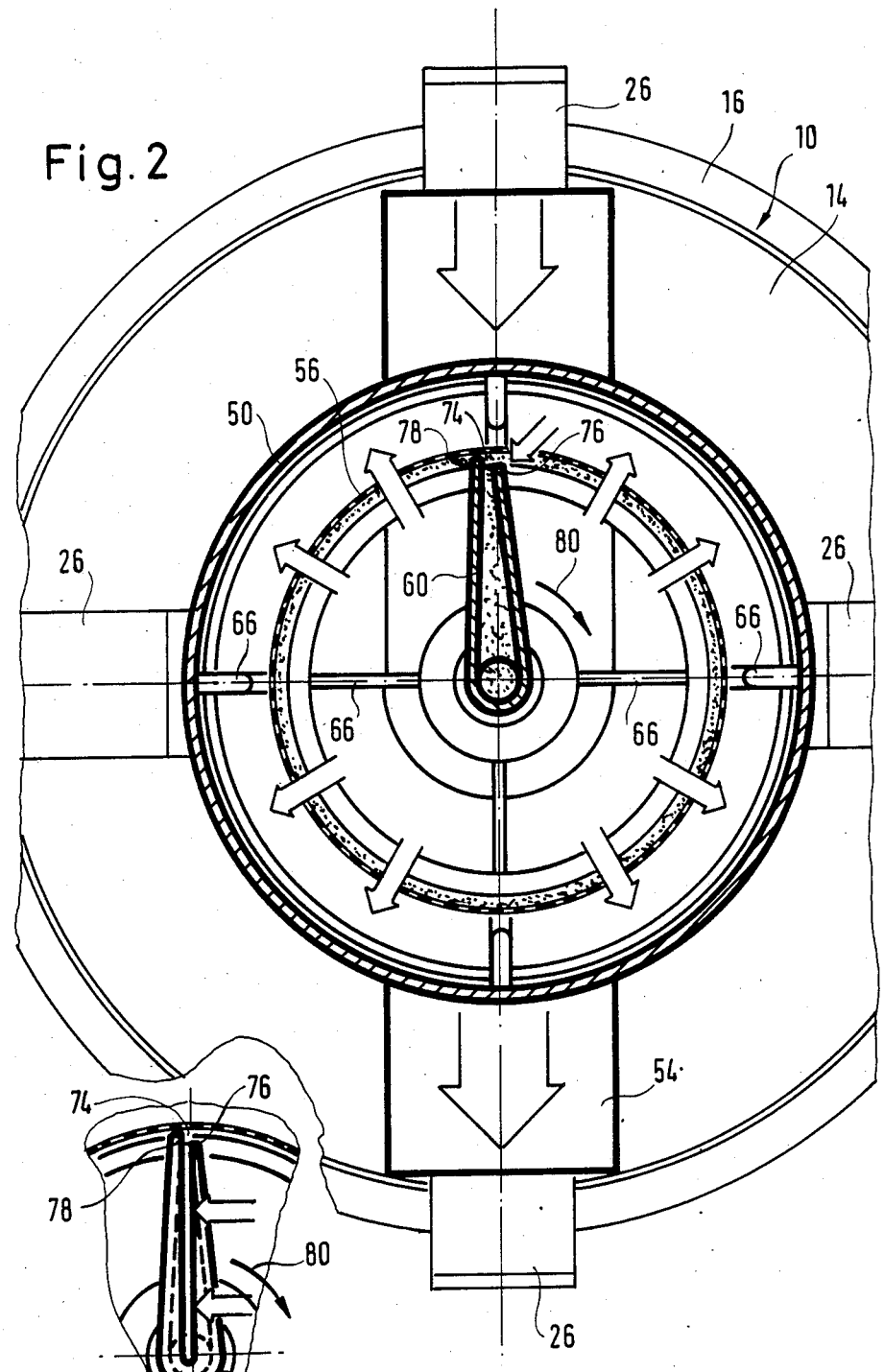
FIG. 2 is a cross sectional elevation along line II—II in FIG. 1, on an enlarged scale.
FIG. 3 is a partial top plan view in the direction of arrow III in FIG. 1.

The rotating vane 60 comprises a slot nozzle 74 which extends along a generatrix of the main portion, being cylindrical in the embodiment shown, of the filter 76 as well as along a radius of the upper portion, being planar in the embodiment, of the filter and is connected to the hollow shaft 62. The slot nozzle 74 is disposed between a leading edge 76 and a trailing edge 78 of the rotating vane 60. A gap is left free between the leading edge 76 and the cylindrical or planar active surface of the filter 76 over which it sweeps. As shown in FIG. 2, this gap is just as great or a little greater than the greatest thickness to be expected of any deposit of material which may form at the inside of the filter 56. The trailing edge 78, on the other hand, extends radially further outwardly and axially upwardly so as to sweep directly along the filter 56.

During operation of the fluidized bed apparatus shown the immersion tube 40 is connected to the pressure end and the gas outlet 54 is conencted to the suction end of a blower (not shown), for instance a radial flow fan of conventional structure which causes a gas, such as dry, heated air to flow downwardly through the immersion tube 40 at considerable velocity. The gas impinges on the dish 24 to be deflected upwardly by the same and then to flow in upward direction along the outer wall of the immersion tube. The diverting shield 44 deflects the gas outwardly and downwardly. In this manner the material 30 contained in the vessel 10 is fluidized and rolled around uniformly.

The spent gas flows off upwarldy through the annular passage 46 and passes through the container top 22 into the interior of the filter 56. The filter catches any dust-like particles of material still entrained by the gas and permits the filtered gas to flow on the gas outlet 54.

The gas flowing in through the immersion tube 40 drives the turbine 70 so that the rotating vane 60 firmly connected to the same by the hollow shaft 62 will be rotated in the direction of arrow 80 in FIGS. 2 and 3. During such movement the trailing edge 78 of the rotating vane 60 wipes off the particles of material which have accumulated at the inner surfaces of the filter 56. These particles are sucked in by the slot nozzle 74. The same happens to those particles of material which are separating from the filter 56 without any action of the trailing edge 78.

The particles of material sucked through the slot nozzle 74 pass through the hollow shaft 62 into the immersion tube 40 and are whirlled intensively with the gas flowing in, downstream of the venturi nozzle 72. In addition they are exposed to forces of flow in the narrow annular space 42 between the lower end of the immersion tube 40 and the dish 24. These forces guarantee that any lumps which still may have formed in the material sucked off from the filter 56 are returned to the vessel 10.

The rotating vane 60 shown to be one-armed in FIGS. 1 to 3 may comprise a plurality of arms if it is desired to sweep across the active surfaces of the filter 56 at especially short intervals.

What is claimed is:

1. A fluidized bed apparatus for treating pulverulent and granular material comprising
   (a) a vessel having a dish-shaped extension,
   (b) an immersion tube protruding into the vessel and ending within the dish-shaped extension, said immersion tube being connectable to a source of gas such that gas will flow through the immersion tube toward the extension and then be deflected by the extension so as to move material within the vessel;
   (c) a filter casing attached to the vessel as a gas outlet from the vessel;
   (d) a filter contained within the casing to prevent the outlet of material from the vessel, said filter having at least one rotatable vane which sweeps across the filter to remove material collected thereon; and
   (e) a turbine positioned within the immersion tube and connected to the vane so as to drive the rotation thereof.

2. The fluidized bed apparatus as claimed in claim 1, wherein the vane is driven by a hollow shaft adapted to suction off material removed from the filter by the vane.

3. The fluidized bed apparatus as claimed in claim 2, wherein the hollow shaft ends within the immersion tube, and the hollow shaft and the immersion tube together form a venturi nozzle for generating low pressure in the hollow shaft.

4. The fluidized bed apparatus as claimed in claims 2 or 3, wherein the rotating vane comprises a slot nozzle connected to the hollow shaft.

5. The fluidized bed apparatus as claimed in claim 4, wherein the slot nozzle is formed between two edges of the rotating vane disposed successively in the direction of rotation, a leading edge leaving a gap between itself and the filter, and a trailing edge sweeping directly along the filter.

6. The fluidized bed apparatus according to claim 1, further comprising a vane ring fixed within the immersion tube upstream of the turbine relative to the gas flow.

7. A fluidized bed apparatus for treating pulverulent and granular material comprising:
(a) a vessel having a dish-shaped extension;
(b) an immersion tube protruding into the vessel and ending within the dish-shaped extension, said immersion tube being connectable to a source of gas such that gas will flow through the immersion tube toward the extension and then be deflected by the extension so as to move material within the vessel;
(c) a filter casing attached to the vessel as a gas outlet from the vessel;
(d) a filter contained within the casing to prevent the outlet of material from the vessel;
(e) at least one rotatable vane which sweeps across the filter to remove material collected thereon; and
(f) a hollow shaft connected to said rotatable vane and adapted to suction off material removed from the filter by the vane, said hollow shaft ending within the immersion tube, and the hollow shaft and the immersion tube together forming a venturi nozzle for generating low pressure in the hollow shaft.

8. The fluidized bed apparatus as claimed in claim 7, wherein the rotatable vane comprises a slot nozzle connected to the hollow shaft.

9. The fluidized bed apparatus as claimed in claim 8, wherein the slot nozzle is formed between two edges of the rotating vane disposed successively in the direction of rotation, a leading edge leaving a gap between itself and the filter, and a trailing edge sweeping directly along the filter.

* * * * *